United States Patent [19] [11] 4,343,702
Riedel [45] Aug. 10, 1982

[54] APPARATUS FOR CLEANING THE INSIDE FACES OF PIPES OR TUBES

[75] Inventor: Erich O. Riedel, Haan, Fed. Rep. of Germany

[73] Assignee: Riedel-Technik GmbH, Haan, Fed. Rep. of Germany

[21] Appl. No.: 205,839

[22] Filed: Nov. 10, 1980

[30] Foreign Application Priority Data

Nov. 9, 1979 [DE] Fed. Rep. of Germany ....... 2945287

[51] Int. Cl.³ .............................................. B01D 29/02
[52] U.S. Cl. .................................... 210/391; 210/402
[58] Field of Search ............... 210/359, 388, 446, 448, 210/391, 398, 435, 498, 499, 402

[56] References Cited

U.S. PATENT DOCUMENTS

| | | | |
|---|---|---|---|
| 551,044 | 10/1895 | Park | 210/498 X |
| 784,170 | 3/1905 | Miller | 210/391 |
| 1,343,078 | 6/1920 | Carter | 210/391 X |
| 3,174,171 | 3/1965 | McDermon | 210/446 X |

FOREIGN PATENT DOCUMENTS 558960 9/1932 Fed. Rep. of Germany .

*Primary Examiner*—John Adee
*Attorney, Agent, or Firm*—Allison C. Collard; Thomas M. Galgano

[57] ABSTRACT

An apparatus for cleaning the inside faces of pipes or tubes from foreign particles sticking thereto, by means of flexible cleaning elements which are oversized relative to the pipe/tube inside diameter to be cleaned, and which are forced through the pipes or tubes under hydraulic pressure is provided, wherein a bar screen disposed on the downstream side of the pipe/tube outlet separates the cleaning elements from the liquid. The apparatus includes a drum-shaped rotatable body having its axis of rotation disposed in a plane normal to the liquid stream direction of flow, on the inside of which there is a screen body or element arranged under such an angle relative to the direction of flow that a lower screen face extremity opens out into an outlet opening.

3 Claims, 7 Drawing Figures

APPARATUS FOR CLEANING THE INSIDE FACES OF PIPES OR TUBES

The present invention relates to an apparatus for cleaning the inside faces of pipes from foreign particles sticking thereto, by means of flexible cleaning elements which are oversized relative to the pipe inside diameter to be cleaned, and which are forced through the pipes under hydraulic pressure. More particularly, it relates to such an apparatus comprising a bar screen to separate the cleaning elements and liquid, after passage through the pipe.

Apparatus of the above-defined type are widely used in processing technology. Their range of applications extends from the cleaning of pipes carrying beverages, for instance beer, to the cleaning of heat exchanger tubes, as well as the cleaning of pipes carrying liquid cement.

The purpose of all of these uses is to free the inside faces of such pipes or tubes from adhering foreign particles or deposits by mechanical abrasion.

The use of such cleaning elements which are normally of a rotatable configuration and, preferably of a spherical shape, is intermittent or also continuous.

When official inspection routines so require, or the operating state of such pipe or tube systems indicates that the inside wall faces of such pipes or tubes are affected by deposits, a cleaning treatment is effected. In a condenser cleaning system, for example, flexible cleaning elements are introduced into the condenser inlet (cooling water inlet) via sluice. This applies to the intermittent type of cleaning process, but a large number of such systems operate continuously.

Since the specific gravity of such flexible cleaning elements should be a little higher than that of the cooling water for the sake of uniform distribution in condenser plants, the cleaning elements enter the cooling tubes via the cooling water inlet, from where they are forced through the tubes under hydraulic pressure. Consequently, the deposits are separated from the tube walls, and are pushed along in front of the flexible cleaning elements and into the condenser outlet, on the downstream side of which separation, between the cooling water and cleaning elements, is effected. A so-called "screen apparatus" is used for this purpose which normally comprises one screen area or a plurality of screen faces. These screen faces consist of so-called "bar grids" in which the bars are disposed at spacings from 6 to 12 mm. Where only one screen face is adopted, the same would be installed with such a slope inside the cylinder, that the cleaning elements are directed to an outlet opening in the lowest position of the screen, and drawn off by suction from that location.

Where several screen faces are provided, they would be arranged in an inclined relationship with respect to each other, forming a port or channel in which the cleaning balls accumulate.

Further bar grids opening into a pipeline which, in turn, is connected to a pump system, are often provided in extension of said screen elements. The mixture composed of flexible cleaning elements and residual water will travel into a pump, from which the cleaning bodies are displaced into a collecting tank ready for reuse.

If the permeability of the screen faces herebefore described is essentially affected by impurities carried by the cooling water, they are cleaned. This is done after turning the screen elements so that they are flushed from their rear faces and/or backwashed.

A major drawback affecting the prior art apparatus resides in the cylindrical shape thereof. The cylindrical configuration renders it very difficult to adapt the screen faces—which require a great deal of technical and economical provisions—to the shape on the inside of their enclosure. Screen faces must be very rugged in such screen apparatus, and very carefully adapted to the inside contours of their casings. This, in turn, results in considerable expense if one considers that the cleaning of the screen faces requires positioning devices to be provided which permit flushing of clogged or contaminated surfaces from their rear faces and/or backwashing of the screen units.

It is an object of this present invention to eliminate the drawbacks described above, and to provide a screen apparatus which, while of simplest design, not only permits high performance to be achieved within a minimum area, but also exhibits such external design features that it takes just a few manipulations to remove what is the functional element proper—namely, the screen body.

To solve this problem, the present invention provides an apparatus for cleaning the inside faces of pipes or tubes from foreign particles sticking thereto, by means of flexible cleaning elements which are oversized relative to the pipe/tube inside diameter to be cleaned, and which are forced through the pipes or tubes under hydraulic pressure, of the type having a bar screen disposed on the downstream side of the pipe/tube outlet, which separates the cleaning elements from the liquid. The apparatus is characterized by the fact that inside a drumshaped rotatable hollow body having its axis of rotation disposed in a plane normal to the liquid stream, there is a screen body or element arranged under such an angle, relative to the normal, that the lower screen face extremity opens out into an outlet opening.

The screen body proper can be adjusted via a pivot rotatably arranged in the cover wall members of the rotatably hollow body, according to another feature of the present invention. This permits sensitive performance adjustments in terms of quantity and quality.

A particularly advantageous screen body shape is obtained if the screen body consists of two screen faces which are relatively inclined in a V-configuration.

Other objects and features of the present invention will become apparent from the following detailed description when taken in connection with the accompanying drawings which disclose several embodiments of the invention. It is to be understood that the drawings are designed for the purpose of illustration only, and are not intended as a definition of the limits of the invention.

In the drawings, wherein similar reference characters denote similar elements throughout the several views.

Figure 1:
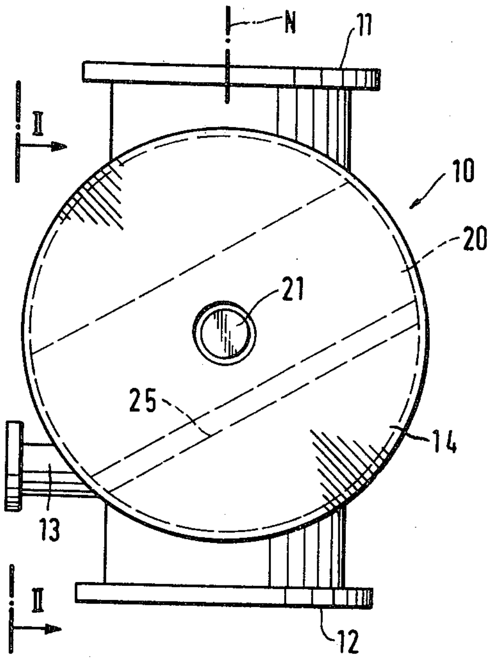
FIG. 1 is a side elevational view of the rotatable hollow body embodying the present invention, with a feed and drain connection, as well as a ball outlet.
Figure 2:
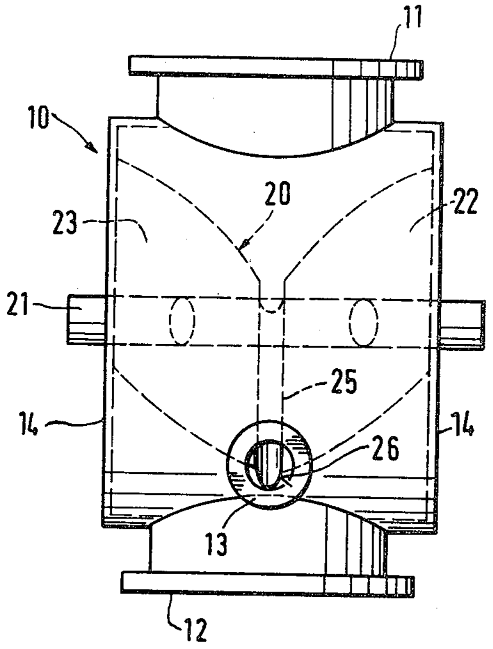
FIG. 2 is another side elevational view of the rotatable hollow body, taken along line II—II of FIG. 1.
Figure 3:
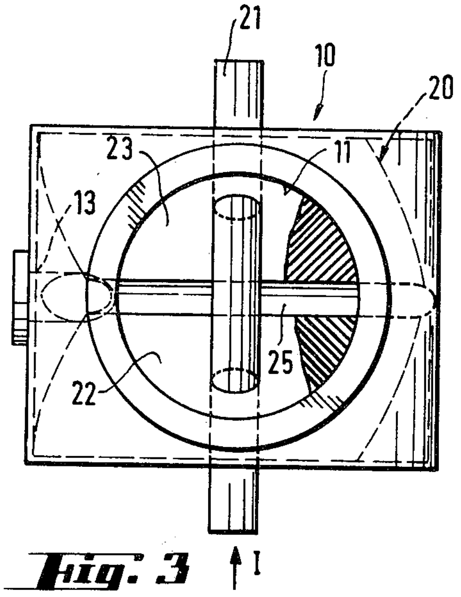
FIG. 3 is a top view of the body according to FIG. 1.

Referring now in detail to the drawings, FIGS. 1–4 show a rotatable hollow body 10 with an inlet 11, an outlet 12, and a ball outlet 13. As may be seen particularly from FIG. 2, this embodiment comprises two screen faces 22, 23 relatively disposed in a V-configuration to form a screen body 20.

To simplify the drawing representation, the cover wall members 14 are shown in a flat representation in all of the figures, while, in actuality, they would be made of dished heads of the type as specified in boiler standard codes.

Figure 4:
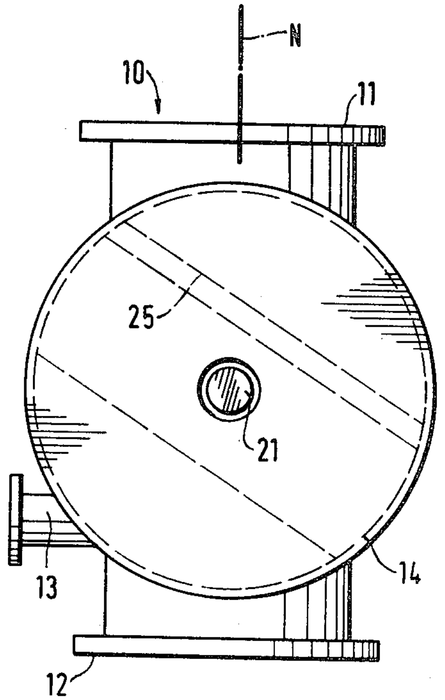
FIG. 4 is an elevational view of the body similar to that of FIG. 1, but with the screen body in flushing position.

Screen faces 22, 23 open out into a port 25 by their lower ends 26. The screen body 20 is rotatable on a pivot 21, which is disposed in the cover wall members 14, to permit flushing of the screen faces from their rear faces and/or backwashing of said faces. Such a flushing or backwashing position is represented in FIG. 4.

Figure 5:
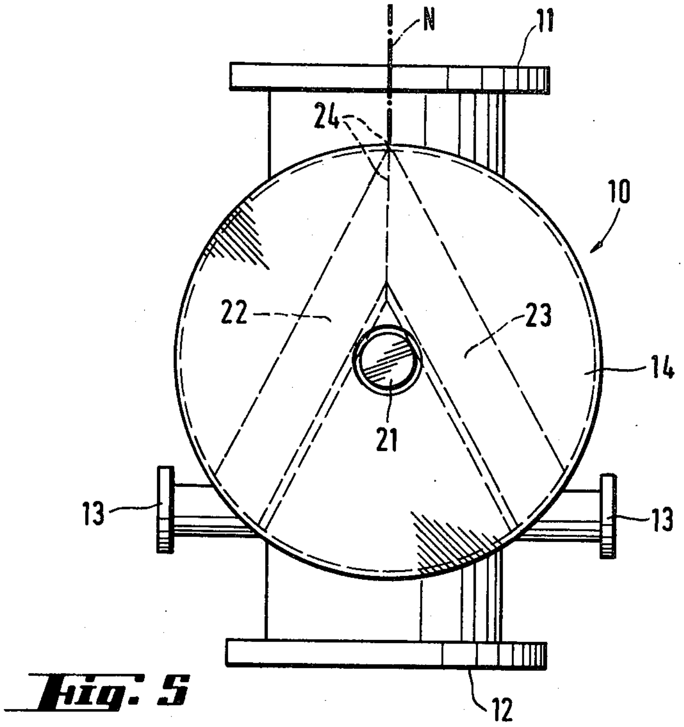
FIG. 5 is a side elevational view of another embodiment of the invention, showing the rotatable hollow body provided with screen faces arranged at an acute angle relative to one another.

FIG. 5 shows rotatable body 10 and two screen faces 22, 23 relatively inclined in a V-pattern, wherein the upper edges 24 are in contact with each other, and the lower edges open into the ball outlet 13.

Figure 6:
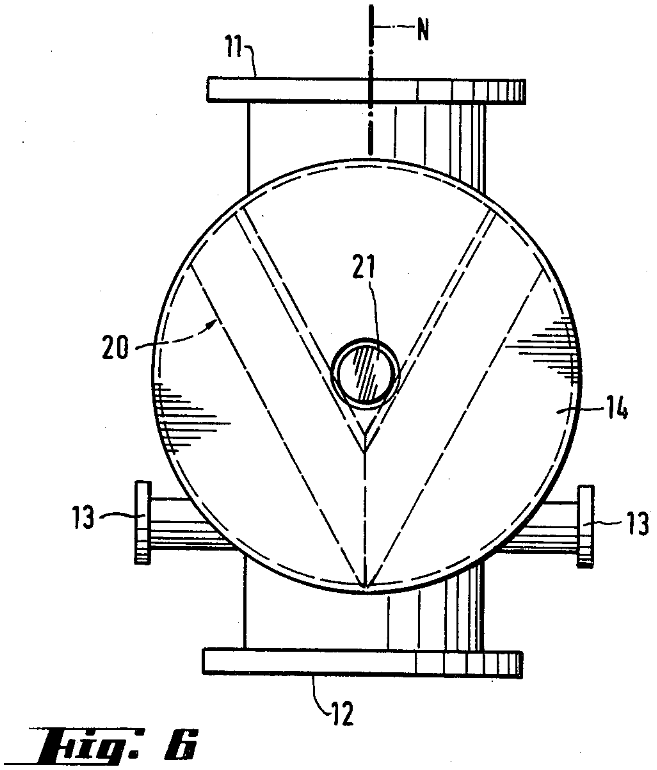
FIG. 6 is an elevational view of the hollow body similar to that of FIG. 5, but with the screen body in flushing position.

FIG. 6 shows the arrangement according to FIG. 5, but in flushing or backwashing position.

Turning now to the operation of the screen apparatus, the liquid stream carrying the cleaning elements will be fed into inlet 11 and will hit the screen face which is inclined relative to the direction of passage N. The gaps of the screen faces 22, 23 are smaller than the diameter of the cleaning bodies, so that the latter will be separated from the liquid component on said screen faces. Separation is not complete, as a certain amount of water will get into the port 25 from where the residual water will be discharged via the ball outlet, together with the cleaning elements.

Figure 7:
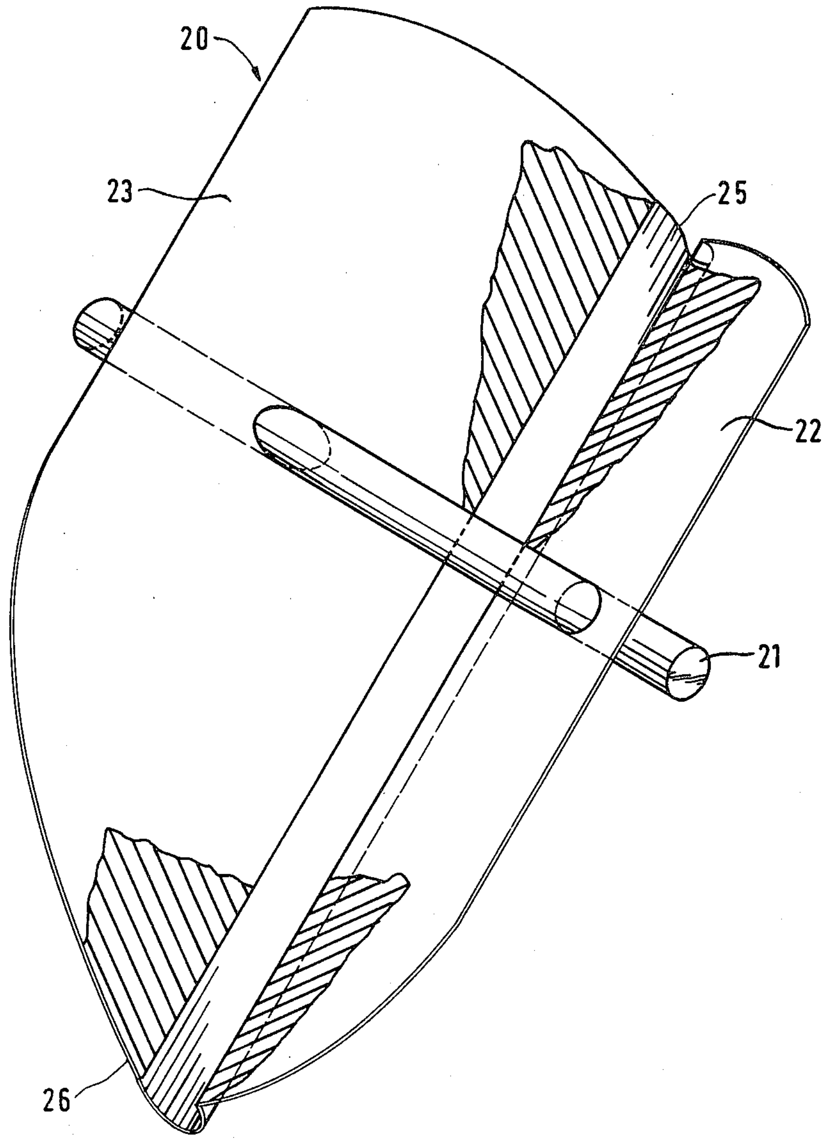
FIG. 7 is an enlarged, perspective view of the screen body, consisting of two composite screen faces and a discharge port.

It is for better comprehension that the two screen faces 22, 23, with pivot 21 and port 25, are shown separately in FIG. 7.

A variety of advantages are offered by the screen apparatus of the present invention. A rotatable hollow body of the type described can be manufactured from semicommercial products, and this rotatable body member 10 can also be exposed to pressure, as it is designed by using the simple formulae adopted for boiler construction.

The shape chosen also permits the unit to have an extremely short overall length in relation to its active cross-sectional area, as compared to all prior art apparatus of this kind. As a result, the unit can also be more easily installed in existing plants, in almost any desired position.

In contrast to the conventional apparatus, the screen according to the present invention comprises only one moving component wich is featured by extreme maintenance ease.

A very essential factor from a process engineering point of view is that the velocity of flow inside the enclosure is drastically reduced in proportion to the screen load. The screen elements can be provided in a variety of configurations, according to the present invention. The screen element may comprise a flat, plain screen, it may have the shape of a "V", or it may be of pyramidal shapes with extremely high, open screen areas.

Thus, while only several embodiments of the present invention have been shown and described, it will be obvious that many changes and modifications may be made thereunto, without departing from the spirit and scope of the invention.

What is claimed is:

1. An apparatus for cleaning the inside faces of pipes from foreign particles sticking thereto by means of flexible cleaning elements which are oversized relative to the pipe inside diameter to be cleaned, and which are forced through the pipes under hydraulic pressure, comprising:

a drum-shaped rotatable hollow body having a flow inlet, a flow outlet and at least one flexible cleaning element outlet port which body has its axis of rotation disposed in a plane generally normal to the liquid stream direction of flow; and a V-shaped screen body disposed inside said drum-shaped body arranged at an angle relative to the direction of flow so as to separate the cleaning elements from the liquid, said V-shaped screen body has at least two screen faces joined by an elongated central trough alignable with said outlet port, said V-shaped screen body being rotatably supported by means of a shaft extending generally centrally through said faces which is rotatably supported in said hollow body.

2. The apparatus according to claim 1, wherein said rotatable hollow body has a pair of oppositely-disposed cover wall members and wherein said screen body is rotatably mounted on said cover wall members of said rotatable hollow body by means of said shaft for full 360° rotation.

3. The apparatus according to claim 1, wherein said rotatable hollow body has a plurality of outlets and wherein said screen faces have upper edges which are in contact and are disposed adjacent to said inlet and lower edges which open into said plurality of outlets.

* * * * *